(12) United States Patent
Castaneda et al.

(10) Patent No.: US 12,484,560 B2
(45) Date of Patent: Dec. 2, 2025

(54) MULTIPLE MODE ARTIFICIAL FISHING LURE

(71) Applicant: SPFM, L.P., San Antonio, TX (US)

(72) Inventors: Robert Castaneda, San Antonio, TX (US); Basil E. Battah, San Antonio, TX (US)

(73) Assignee: SPFM, L.P., San Antonio, TX (US)

( * ) Notice: Subject to any disclaimer, the term of this patent is extended or adjusted under 35 U.S.C. 154(b) by 101 days.

(21) Appl. No.: 17/451,773

(22) Filed: Oct. 21, 2021

(65) Prior Publication Data
US 2022/0142132 A1 May 12, 2022

Related U.S. Application Data

(63) Continuation of application No. 15/594,123, filed on May 12, 2017, now abandoned, which is a
(Continued)

(51) Int. Cl.
*A01K 85/01* (2006.01)
*A01K 61/95* (2017.01)
(Continued)

(52) U.S. Cl.
CPC .............. *A01K 85/01* (2013.01); *A01K 61/95* (2017.01); *A01K 65/00* (2013.01); *A01K 91/06* (2013.01); *A01K 93/00* (2013.01); *A01K 93/02* (2013.01); *A01K 97/00* (2013.01); *A01K 97/20* (2013.01); *A01K 99/00* (2013.01); *G01B 7/02* (2013.01); *G01G 17/00* (2013.01); *G01G 19/415* (2013.01); *G01G 23/32* (2013.01); *G01S 5/0027* (2013.01); *G01S 19/13* (2013.01); *G01S 19/14* (2013.01); *G06K 7/10366* (2013.01); *G06K 7/10415* (2013.01); *G08B 3/10* (2013.01); *A01K 85/16* (2013.01); *G01G 19/60* (2013.01); *Y02A 40/80* (2018.01)

(58) Field of Classification Search
CPC ...... A01K 85/00; A01K 85/01; A01K 85/015; A01K 85/017; A01K 85/16
USPC ... 43/42.31, 17.1, 17.6, 42.24, 42.28, 42.36, 43/42.48
See application file for complete search history.

(56) References Cited

U.S. PATENT DOCUMENTS

| 5,331,760 A | * | 7/1994 | DuMont | ................ | A01K 93/02 43/17.1 |
| 5,461,815 A | * | 10/1995 | Rodgers | ................ | G04C 3/002 43/17.6 |

(Continued)

*Primary Examiner* — Kimberly S Berona
*Assistant Examiner* — Kevin M Dennis

(57) ABSTRACT

A multiple mode fishing lure that includes a main body portion having a waterproof inner capsule, the waterproof inner capsule containing an electronic circuit to produce sounds which mimic bait fish. The electronic circuit includes a controller having pre-recorded bait fish sounds replaceably stored thereon and operationally coupled to a speaker to broadcast the bait fish sounds, a power source for providing power to the components of the electronic circuit, and a plurality of electrodes, wherein each electrode can be actuated, and wherein actuation of at least one of the plurality of electrodes gives an operational result. The multiple mode fishing lure further includes at least one hook coupled to the main body.

19 Claims, 11 Drawing Sheets

Related U.S. Application Data continuation of application No. 14/798,315, filed on Jul. 13, 2015, now abandoned, which is a continuation-in-part of application No. 14/728,781, filed on Jun. 2, 2015, now abandoned, which is a continuation-in-part of application No. 13/920,786, filed on Jun. 18, 2013, now abandoned.

(60) Provisional application No. 61/660,898, filed on Jun. 18, 2012.

(51) Int. Cl.

| | | |
|---|---|---|
| A01K 65/00 | (2006.01) | |
| A01K 85/16 | (2006.01) | |
| A01K 91/06 | (2006.01) | |
| A01K 93/00 | (2006.01) | |
| A01K 93/02 | (2006.01) | |
| A01K 97/00 | (2006.01) | |
| A01K 97/20 | (2006.01) | |
| A01K 99/00 | (2006.01) | |
| G01B 7/02 | (2006.01) | |
| G01G 17/00 | (2006.01) | |
| G01G 19/415 | (2006.01) | |
| G01G 19/60 | (2006.01) | |
| G01G 23/32 | (2006.01) | |
| G01S 5/00 | (2006.01) | |
| G01S 19/13 | (2010.01) | |
| G01S 19/14 | (2010.01) | |
| G06K 7/10 | (2006.01) | |
| G08B 3/10 | (2006.01) | |

(56) References Cited

U.S. PATENT DOCUMENTS

| | | | | |
|---|---|---|---|---|
| 5,511,335 A * | 4/1996 | Langer | ............... | A01K 97/00 43/17.1 |
| 5,697,182 A * | 12/1997 | Rodgers | ............... | G04C 3/002 43/42.31 |
| 6,684,556 B1 * | 2/2004 | Arbuckle | ............... | A01K 85/01 43/42.31 |
| 6,789,347 B1 * | 9/2004 | West | ............... | A01K 85/01 43/17.1 |
| 6,807,766 B1 * | 10/2004 | Hughes | ............... | A61F 5/48 43/42.22 |
| 7,207,135 B1 * | 4/2007 | Williams, Jr. | ............... | A01K 85/01 43/42.31 |
| 7,333,395 B2 * | 2/2008 | Lewis | ............... | A01K 79/02 43/17.1 |
| 7,669,360 B2 * | 3/2010 | Davidson | ............... | A01K 97/00 43/43.12 |
| 2004/0200125 A1 * | 10/2004 | Albanito | ............... | A01K 85/01 43/42 |
| 2005/0097811 A1 * | 5/2005 | Scribner | ............... | A01M 1/2011 43/131 |
| 2006/0010763 A1 * | 1/2006 | Podlewski | ............... | A01K 85/16 43/42.31 |
| 2006/0117640 A1 * | 6/2006 | Castaneda | ............... | A01K 85/01 43/42.31 |
| 2009/0007480 A1 * | 1/2009 | Braun | ............... | A01K 85/16 43/17.1 |
| 2009/0139129 A1 * | 6/2009 | Hicks | ............... | A01K 67/033 43/4.5 |
| 2010/0251595 A1 * | 10/2010 | Leung | ............... | A01K 85/01 43/2 |
| 2011/0061287 A1 * | 3/2011 | Ogawa | ............... | A01K 85/01 43/4.5 |
| 2012/0005940 A1 * | 1/2012 | Thomas | ............... | A01K 85/01 43/17.1 |
| 2012/0204467 A1 * | 8/2012 | Palmer | ............... | A01K 79/02 43/4.5 |
| 2013/0067791 A1 * | 3/2013 | Gao | ............... | A01K 85/01 43/17.6 |
| 2013/0067792 A1 * | 3/2013 | Thomas | ............... | A01K 85/01 43/42.31 |
| 2013/0168161 A1 * | 7/2013 | Saulters | ............... | G01G 19/60 177/148 |
| 2014/0115944 A1 * | 5/2014 | Thomas | ............... | A01K 85/01 43/4.5 |

\* cited by examiner

MULTIPLE MODE ARTIFICIAL FISHING LURE

STATEMENT OF PRIORITY

The present application is a continuation of U.S. Non-Provisional application Ser. No. 15/594,123, titled "Multiple Mode Artificial Fishing Lure," which is a continuation of U.S. Nonprovisional application Ser. No. 14/798,315, titled "Systems and Methods for Monitoring and Communicating Fishing Data" and filed Jul. 13, 2015, which is a continuation-in-part and claims priority to U.S. Nonprovisional application Ser. No. 14/728,781, titled "Multiple Mode Artificial Fishing lure" and filed on Jun. 2, 2015, which is a continuation-in-part and claims priority to U.S. Nonprovisional application Ser. No. 13/920,786, titled "Multiple Mode Artificial Fishing Lure" and filed on Jun. 18, 2013, which claims priority to U.S. Provisional Application No. 61/660,898, titled "Multiple Mode Artificial Fishing Lure," filed Jun. 18, 2012.

TECHNICAL FIELD

The present disclosure generally relates to an aquatic life simulation apparatus capable of producing sounds to mimic aquatic life and reading the environmental conditions of the water. More specifically, the present disclosure relates to an aquatic life simulation apparatus that closely replicates the natural behavior and sounds of live bait species and other aquatic species, both with regard to physical appearances and sound patterns, is capable of reading the environmental condition of the water, and is configured to communicate with surface electronic devices capable of changing various characteristics of the apparatus based on the changes in the environmental conditions of the water.

BACKGROUND OF THE INVENTION

Early on, mankind relied on fishing as a means of survival. However, over the years, fishing has evolved from solely a means of survival to a sport. In addition to the reasons for fishing itself having changed, so have the methods employed. While the first fisherman may have relied on rudimentary spears, nets, or even their bare hands to capture fish, today anglers heavily rely on live bait or artificial lures.

There is a variety of live bait available for use, and even a much wider array of surprisingly sophisticated fishing lures available to bolster the success of any fisherman. These lures come in a wide variety of shapes, sizes, and colors. This, in part, is a result of the fact that each size, shape, and color scheme of a particular lure strongly affects the success or failure of a fisherman under particular conditions. For example, a lure having reflective properties may be particularly useful for top water use on a sunny day. That is, as the lure is reeled in it will shimmer in the sun in a manner to attract surrounding fish.

An overwhelming majority of anglers agree in one very important aspect—artificial lures are far superior in catching fish and ease of use when compared to natural bait. It is estimated that out of all the professional or semi-professional fish anglers, ninety percent prefer the use of artificial lures over live bait. Such is the result for several reasons. Artificial lures can be easily switched out with one another to maximize productivity according to changing conditions. Also, artificial lures are generally cheaper than live bait. Moreover, live bait is not allowed in all professional and non-professional fishing tournaments. Finally, artificial lures are extremely durable—they can be used over and over again, while live bait obviously has a short operating life and is seasonal.

The development of better lures is further spurred on by the ever-increasing popularity of fishing as a competitive sport. In fact, there is constantly growing number of publications, media websites, blogs and other types of informative news dedicated to the sport of fishing. Moreover, it is not uncommon to come across television programming dedicated solely to fishing. In light of the growing popularity of the sport, and the endless combinations for lure design, a tremendous amount of time and effort is devoted to producing the very best lure. It is not uncommon for a company to spend several thousands of dollars on the research and development of a single artificial lure alone.

Despite the tremendous variety in available lures and their technological advances in recent years, all currently available lures are limited in view of the present disclosure. That is, while a staggering amount of time and effort has been dedicated to developing the most effective size, shape, and color combination for particular lures, each of these lures lacks an important dimension provided by the present apparatus.

The currently available technology is not configurable to have an effective appearance and produce acoustical signals to entice surrounding fish. Such acoustical signals alert fish to the lure and help the fish determine lure location. Additionally, current technology is not capable of being programmed to mimic natural live bait species.

In view of the limitations associated with available lures, including their inability to produce acoustical signals and resulting limited ability to attract fish, a great need exists for an artificial lure that offers the same benefits as available lures and additionally attracts fish via acoustical signal patterns.

One advantage of such an artificial lure may be cost reduction. Some fisherman may employ a "croaker" fish or "croaking" bait. Currently, the only option a fisherman has when using Croaker fish as bait is to purchase actual, live bait. Typically, these types of bait are purchased by a standard size bucket-full at a cost of approximately twenty dollars per bucket. With typical use, a bucket-full of such bait lasts about a half day. As such, a full day of fishing while using this type of bait costs approximately forty dollars for bait alone. Thus, there remains a need for a lure which simulates the croaker bait, but is reusable, thus reducing bait cost.

Another problem with current bait and lures is the inability to monitor aquatic life and report findings back to the angler. Such information may assist the angler in determining whether conditions are prime for fishing and/or what type of bait is best suitable for the present conditions.

SUMMARY OF THE INVENTION

It is an object of the present disclosure to provide a multiple mode fishing lure that includes a main body portion having a waterproof inner capsule, the waterproof inner capsule containing an electronic circuit to produce sounds to mimic bait fish. The electronic circuit includes a controller having bait fish sounds replaceably stored thereon and operationally coupled to a speaker to broadcast the bait fish sounds, a power source for providing power to the electronic circuit, and a plurality of electrodes, wherein each electrode may be actuated via an actuation means, and wherein actuation of at least one of the plurality of electrodes gives an operational result. The multiple mode fishing lure further includes at least one hook coupled to the main body.

It is another object of the present disclosure to provide a multiple mode fishing lure, wherein the operational result is changing a power state of the fishing lure.

It is another object of the present disclosure to provide a multiple mode fishing lure, wherein the operational result is obtained by actuation of all of the plurality of electrodes.

It is another object of the present disclosure to provide a multiple mode fishing lure, wherein the actuation means comprises a physical touch of the plurality of electrodes.

It is another object of the present disclosure to provide a multiple mode fishing lure, wherein the actuation means comprises an aqueous solution between the plurality of electrodes, thereby enabling electricity to flow therebetween.

It is another object of the present disclosure to provide a multiple mode fishing lure, wherein the operational result is changing the bait fish sound broadcast by the speaker.

It is another object of the present disclosure to provide a multiple mode fishing lure, wherein the operational result is obtained by actuation of a subset of the plurality of electrodes.

It is another object of the present disclosure to provide a multiple mode fishing lure, wherein at least one of the plurality of electrodes is a hook hanger.

It is another object of the present disclosure to provide a multiple mode fishing lure, wherein each of the plurality of electrodes is a hook hanger.

It is another object of the present disclosure to provide a multiple mode fishing lure, wherein said controller turns off the multiple mode fishing lure after a predetermined period of time has expired, unless there is electrical conductivity on at least one of the plurality of electrodes before the predetermined period of time occurs.

It is another object of the present disclosure to provide a multiple mode fishing lure, wherein the controller turns off the multiple mode fishing lure after a predetermined period of time has expired, unless there is communication with an external device before the predetermined period of time occurs.

It is another object of the present disclosure to provide a multiple mode fishing lure, further comprising an aqueous ambient condition monitoring means for acquiring aqueous ambient condition data and communicably coupled to the controller, wherein an external device is configured to read the acquired aqueous ambient condition data from the multiple mode fishing lure.

It is another object of the present disclosure to provide a multiple mode fishing lure, further comprising a radio-frequency identification (RFID) tag programmed with fishing lure information, and wherein an external device is configured to read the RFID tag to obtain the fishing lure information.

It is another object of the present disclosure to provide a multiple mode fishing lure, wherein the controller further includes fishing lure information, the multiple mode fishing lure further including a Bluetooth transceiver capable of communicating said fishing lure information with an external device.

It is another object of the present disclosure to provide a multiple mode fishing lure, further comprising a wireless transceiver for communicating information between the multiple mode fishing lure and an external device, wherein the external device can update the sounds replaceably stored on the controller which is broadcast via the speaker.

It is another object of the present disclosure to provide a multiple mode fishing lure, wherein the speaker is a piezoelectric brass speaker.

It is another object of the present disclosure to provide a system that includes a multiple mode fishing lure which includes a main body portion having a waterproof inner capsule, wherein the waterproof inner capsule contains an electronic circuit to produce sounds which mimic bait fish. The electronic circuit includes a controller having reversibly programmable memory with bait fish sounds replaceably stored thereon and operationally coupled to a speaker to broadcast the bait fish sounds, a plurality of electrodes, wherein each electrode of the plurality of electrodes is actuated via an actuation means, and wherein actuation of at least one electrode of the plurality of electrodes gives an operational result; and a power source for providing power to the electronic circuit; and at least one hook coupled to the main body. The system further includes an external device communicably coupled to the controller of the multiple mode fishing lure and configured to store the bait fish sounds thereon and read fishing lure information therefrom.

In view of the foregoing and other related objectives, the present disclosure provides a highly innovative aquatic life simulation apparatus. Most embodiments, generally, have a very durable exterior body and are air brushed to the likeness of a particular species. That is, the air brush finish adds detail to the apparatus so that it can take on several appearances—any of which can be selected according to conditions and desires.

A novel feature of the present disclosure is the fishing lure's inner capsule and combination of components contained therein. In most preferred forms, the inner capsule is waterproof and contains a "sound chip," capable of producing acoustical patterns very closely resembling those of any number of aquatic species. The desired result may be to entice surrounding fish or simply to replicate a particular species within its natural environment. In the preferred form, this sound chip is operationally coupled with a power source and a speaker. Remarkably, this sound chip is embedded with acoustical information associated with any number of specific aquatic species.

As mentioned, the sound chip may emit several distinct acoustical patterns, and in one preferred form, the apparatus of the present disclosure will be able to accurately reproduce the sounds and movements associated with creatures eaten by game fish. For example, a particularly effective embodiment of the present disclosure is capable of performing the sound and pattern of "croaking" associated with species commonly preyed upon by game fish. By way of further example, the sound chip may repeat a pattern where it emits acoustical signals for a period of time and then remains dormant for a period of time. In some embodiments, the emission and dormant periods of time may be the same. Such a pattern may be preferred in that it allows for the "jerk and reel" procedure commonly preferred by fisherman.

Certain embodiments of the present disclosure include other novel features such as realistic appearing eyes and body members. That is, these embodiments include LEDs throughout the apparatus eye and along the body. Such characteristic is particularly useful in replicating the effect of the sun reflecting from aquatic life.

Other embodiments of the present disclosure allow the apparatus to acquire data relating to environmental conditions of fish habitats. The apparatus contains instrumentation that can record pressure, temperature, turbidity, and pH levels among others. The apparatus further contains algorithms to modify the acoustical patterns emitted based on the recorded data. The color and frequency of the light emitted from the LEDs is determined by algorithms based on the data collected by the apparatus.

Another novel feature disclosed herein allows the apparatus to communicate with electronic devices such as onboard computers, depth finders, tablets, hand-held PDAs and smart phones. These embodiments include wireless communication hardware, such as WiFi, Bluetooth, or radio frequency antennas. A custom application is loaded onto personal electronic devices that are programmed to receive recorded data through similar wireless communication hardware. The application also allows the user to send commands to the apparatus to modify acoustical patterns and LED performance.

DETAILED DESCRIPTION OF THE INVENTION

Figure 1A:
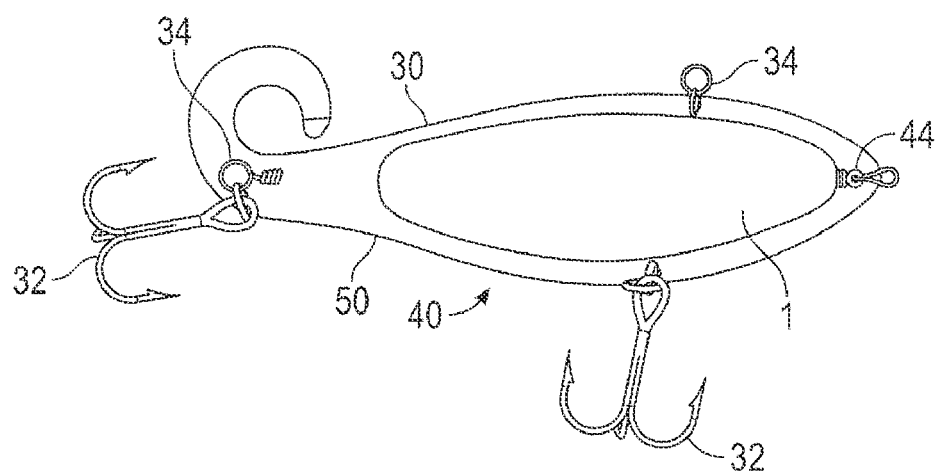
FIG. 1A is a side view of an aquatic life simulation apparatus, according to one or more embodiments.

Referring to FIG. 1A, the aquatic life simulation apparatus (the multiple mode fishing lure) of the present disclosure is generally designated by numeral 40. Apparatus 40, in some embodiments, is one of three primary colors: copper, bronze, or chrome. In further embodiments, apparatus 40 may be finished with some material to further enhance the reflective value of apparatus 40. While the preferred embodiment is thought to be most beneficial when having a metallic-type finish as mentioned above, other useful embodiments are envisioned where apparatus 40 may be of other color scheme. For instance, a neon color combination scheme is thought to be particularly useful for attracting fish under certain conditions.

Figure 1B:
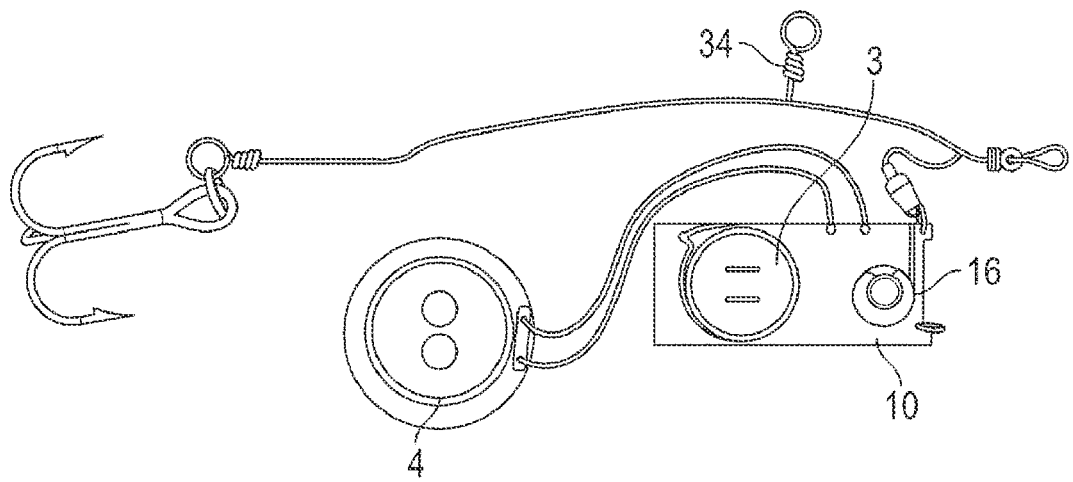
FIG. 1B is a view of the electronics arranged within the inner capsule of the apparatus, according to one or more embodiments.

Apparatus 40 is characterized by inner capsule 1. In a preferred embodiment, as depicted in FIG. 1B, inner capsule 1 houses and protects speaker 4, controller 10, battery 3, and motion sensor 16. Inner capsule 1 holds speaker 4, controller 10, battery 3, and motion sensor 16 in a water-free (waterproof) environment, and further acts as an impact absorbing means for these components. As such, the components contained within capsule 1 are protected from both water and incident forces by virtue of being contained within capsule 1.

In a preferred embodiment, inner capsule 1 may be primarily composed of rubber, plastic, fiberglass, or some combination thereof. Other embodiments are particularly useful if speaker 4 is not housed within capsule 1, but is adjacent to capsule 1 (not shown) and remains in combination with the other referenced components contained with capsule 1. In such embodiments, speaker 4 is a water-resistant or waterproof speaker appropriately sized to fit within apparatus 40. Such speaker members are known, and will be apparent to those skilled in the art.

As mentioned, operation of apparatus 40 involves the components housed within capsule 1. In some embodiments, upon a trigger event, such as impact with water or relative motion of apparatus 40, controller 10 performs according to programming stored on its memory. That is, embodiments are envisioned where controller 10 is operationally coupled with motion sensor 16. In such embodiments, motion sensor 16 reacts to changes in velocity of apparatus 40. Upon sufficient reaction, motion sensor 16 signals controller 10 to initiate performance. Controller 10 then acts according to the reaction of motion sensor 16. This action may be carried out for a determined time and then cease, or continue in repeated fashion. Finally, one of the most novel aspects of the present disclosure is the ability of controller 10 to accurately and precisely replicate the acoustical patterns of a variety of aquatic life. This replication is carried out according to stored programming of controller 10.

As used herein, "memory" may be any type of storage or memory known to those skilled in the art capable of storing data and/or executable instructions. Memory may include volatile memory (e.g., RAM), non-volatile memory (e.g., hard-drives), or a combination thereof. Additionally, "reversibly programmable memory" refers to any form of memory capable of storing data and/or executable instructions received from a user-controlled device (e.g., computer, smartphone, or tablet). Examples of such memory include, without limitation, all variations of non-transitory computer-readable hard disk drives, inclusive of solid-state drives. Further examples of such may include RAM external to a computer or controller or internal thereto (e.g., "on-board memory"). Example embodiments of RAM may include, without limitation, volatile or non-volatile memory, DDR memory, Flash Memory, EPROM, ROM, or various other forms, or any combination thereof generally known as memory or RAM. The RAM, hard drive, and/or controller may work in combination to store and/or execute instructions.

Controller 10 is further operationally coupled with, and powered by, battery 3. In the preferred embodiment, battery 3 is a relatively small, low voltage battery. Such is preferred as the target weight of apparatus 40 is less than approximately one half ounce.

Controller 10 is electronically coupled with speaker 4, where speaker 4 emits acoustical patterns according to signals received from controller 10. In the preferred embodiment, speaker 4 is of a "micro speaker" variety as known to those skilled in the art, typically having a diameter of approximately less than one inch. In one embodiment, speaker 4 is a piezoelectric brass speaker as known to those skilled in the art.

Other useful embodiments are envisioned where some light emitting means, such as a series of light emitting diodes (LED), is further in combination with controller 10. In such embodiments, the LEDs are activated upon signals received from controller 10. The most beneficial arrangement of such light emitting means is envisioned where LEDs are dispersed along the peripheral body of apparatus 40 and/or placed as eye members. Such arrangement is thought to be most beneficial in simulating real-life behavioral characteristics. However, the LED can be position in practically any part of the apparatus.

Referring now back to FIG. 1A, apparatus 40 may be further characterized by support member 30. In the preferred embodiment, support member 30 aligns with capsule 1 and is configured to ensure apparatus 40 remains engaged with a fishing line. Support member 30 imparts rigidity and strength to apparatus 40 and may be configured to directly receive and mate with a hook 32.

Support member 30 may also receive a hook connection means 34. Hook connection means 34 may be a fishing line of sufficient strength to withstand the force exerted by an expected fish snared by hook 32. In each of these embodiments, support member 30, in combination with hook 32, or in combination with both hook 32 and hook the connection means 34, provide a mechanism whereby a fish may take apparatus 40 within its mouth and then become snagged by hook 32. As the fish attempts to retreat, support member 30, hooks 32, and possibly hook connection means 34, hold the fish engaged with apparatus 40 while apparatus 40 remains secured to a fishing line. Finally, other useful embodiments are envisioned where capsule 1 is further configured to replace support member 30. That is, by ensuring capsule 1 is of sufficient strength, capsule 1 may directly receive and mate with hook 32 or hook connection means 34.

Apparatus 40 further has an outer member 50. Outer member 50 surrounds and substantially covers capsule 1 and support 30. Outer member 50, in some embodiments, is shaped in a way that can house all components and generate the pitch while being as hydro dynamically efficient as possible and/or generating the same underwater hydro force as fish the same size as the apparatus 40.

Also, member 50 primarily provides apparatus 40 with its actual, final physical appearance. As such, in its most preferred form, member 50 is comprised mostly of plastic or rubber, or some composite thereof and finished with metallic-type appearing finish. Such a finish is particularly useful as it reflects sunlight to further attract predator attention. As mentioned, particularly useful embodiments are envisioned where outer member 50 contains LED or some other light-emitting means (such as micro-bulbs or fiber optics members) along its length and along eyes 44. Such embodiments, through their light emitting quality, and in combination with acoustical signals sent from apparatus 40, further attract the attention of surrounding fish.

Visual Stimulation Emitting Diodes (VSED) are, in some embodiments, placed inside eyes 44 of outer capsule 50. VSEDs have a recurring pattern of fading-in fading-out bright red, white, green or white and dark, and repeating with a predetermined time pattern. This process simulates that natural occurrence found in most species of fish called "flashing," a natural occurrence of sunlight reflecting on the surface of fishes' eyes while traveling in the water at high speeds.

Figure 2:
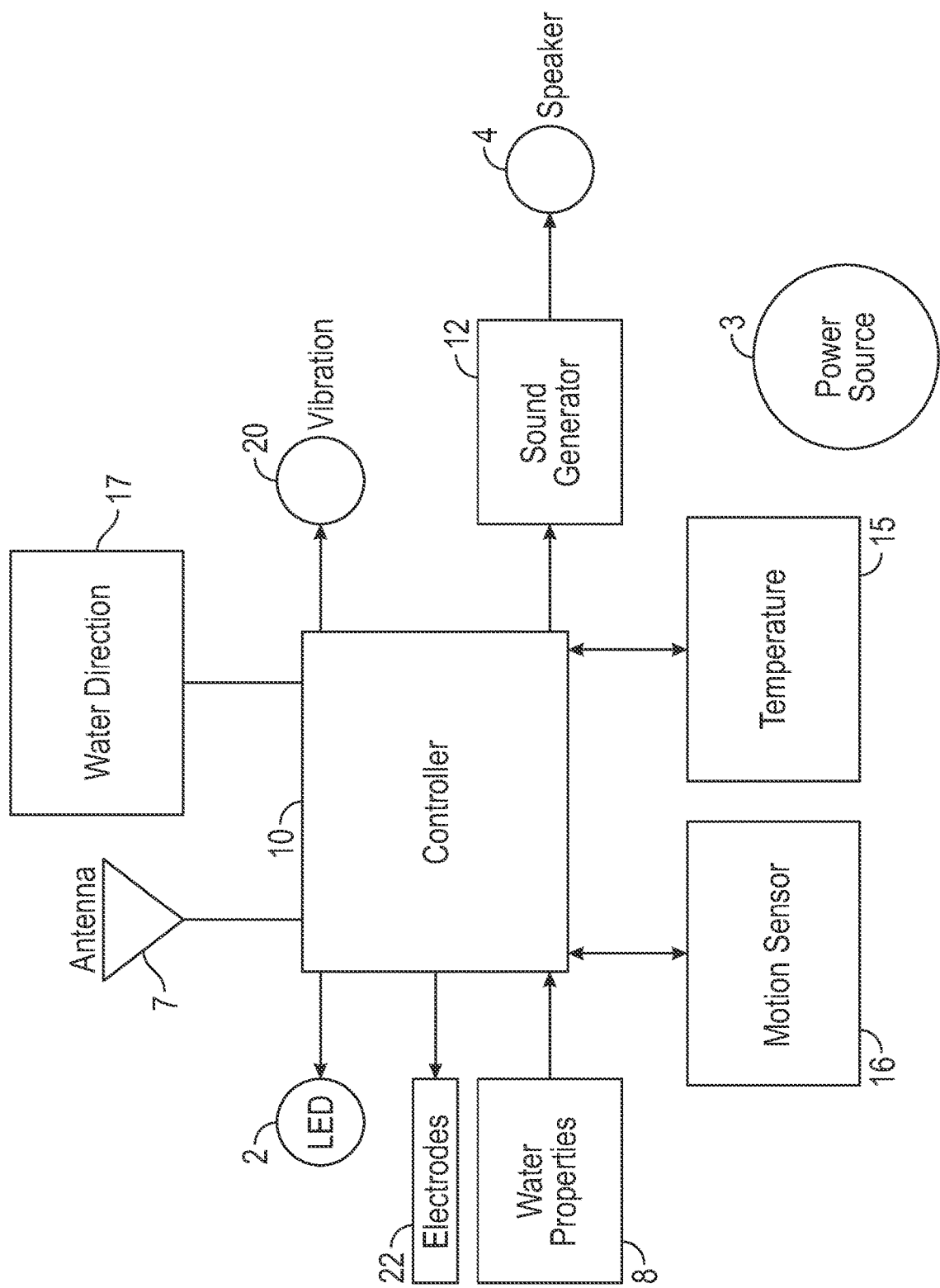
FIG. 2 is a block diagram of the aquatic life simulation apparatus capable of data acquisition and wireless communication, according to one or more embodiments.
Figure 8:
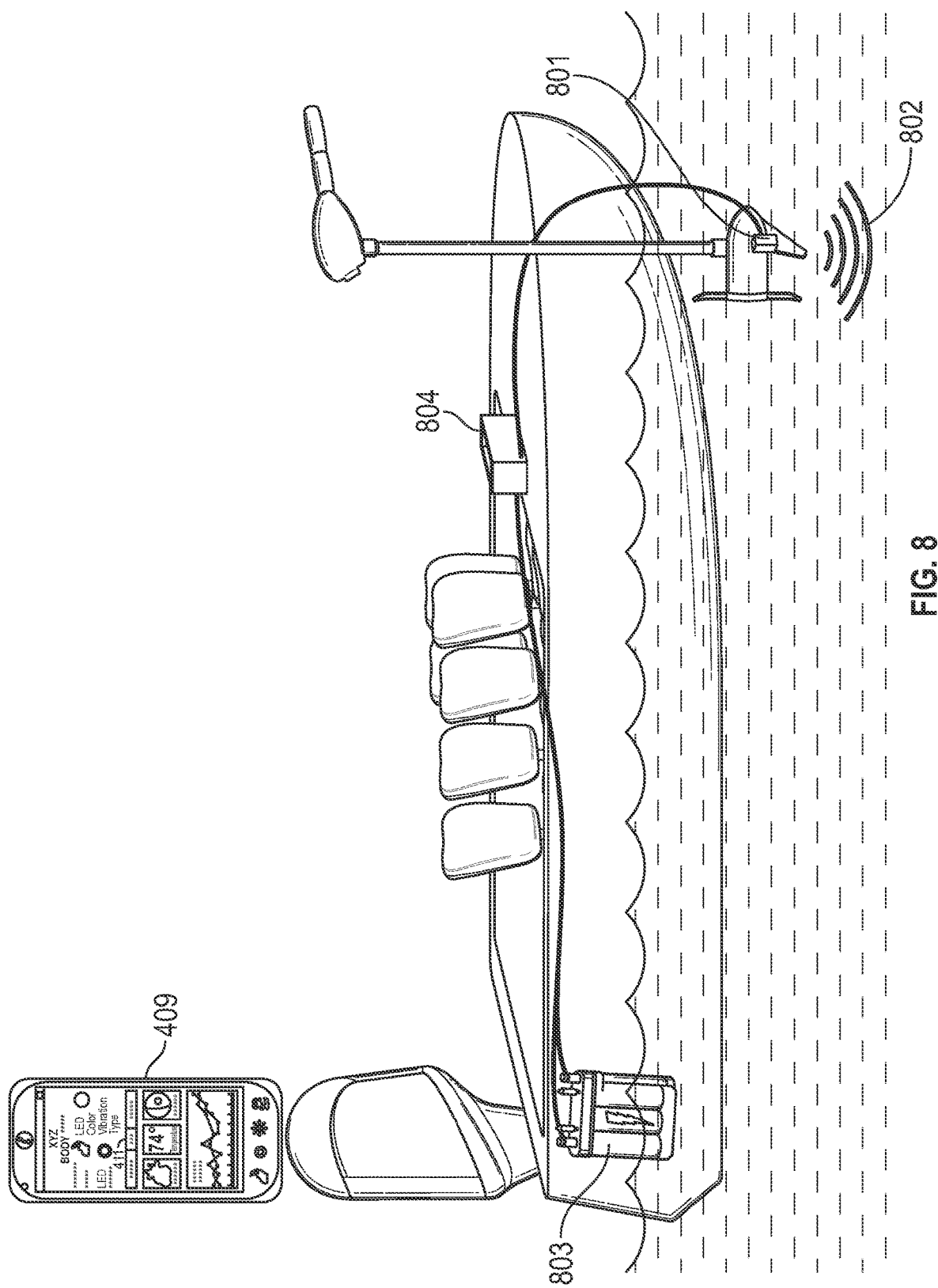
FIG. 8 displays other uses for the custom application and device according to one embodiment of the present invention.

In some embodiments, controller 10 will communicate via wireless communication platforms with surface on-board computers, tablets, hand-held PDAs and smart phones to relay environmental, water and structural conditions of fish habitats. In these embodiments, controller 10 can be a Submersible Micro Integrated Circuit (SMIC) and maybe located either inside or outside the lure. For example SMIC can be located anywhere on the fishing boat as illustrated in FIG. 8. FIG. 2 represents a block diagram of such an embodiment of the aquatic life simulation apparatus, according to one or more embodiments. In this embodiment, apparatus 40 features speaker 4, controller 10, motion sensor 16, battery 3, water direction measurement system 17, antenna 7, at least one LED 2, water detection sensor 8, temperature sensor 15, and a plurality of electrodes 22. According to one embodiment of the present disclosure, the antenna 7 is 2.4 GHz antenna, the motion sensor 16 is a 3-axis accelerometer, the water detection sensor 8 is a micro fluidic sensor, and temperature sensor is a thermocouple or other temperature measuring device that is known to those skilled in the art.

Such sensors and monitoring devices may comprise an aqueous ambient condition monitoring means which acquire aqueous ambient condition data. It will be appreciated that not all sensors and monitoring devices are discussed herein, but the present disclosure contemplates incorporation of any other sensors and monitoring devices capable of obtaining information associated with the water when the aquatic life simulation apparatus is cast into the water.

In some embodiments, the antenna 7 enables various devices (e.g. a surface on-board computer, tablet, hand-held PDA and/or smart phone) to obtain information acquired by any of the an aqueous ambient condition monitoring means, thus enabling the angler to analyze the current fishing conditions and amend their bait or fishing position to optimize the likelihood of catching a fish.

Figure 4:
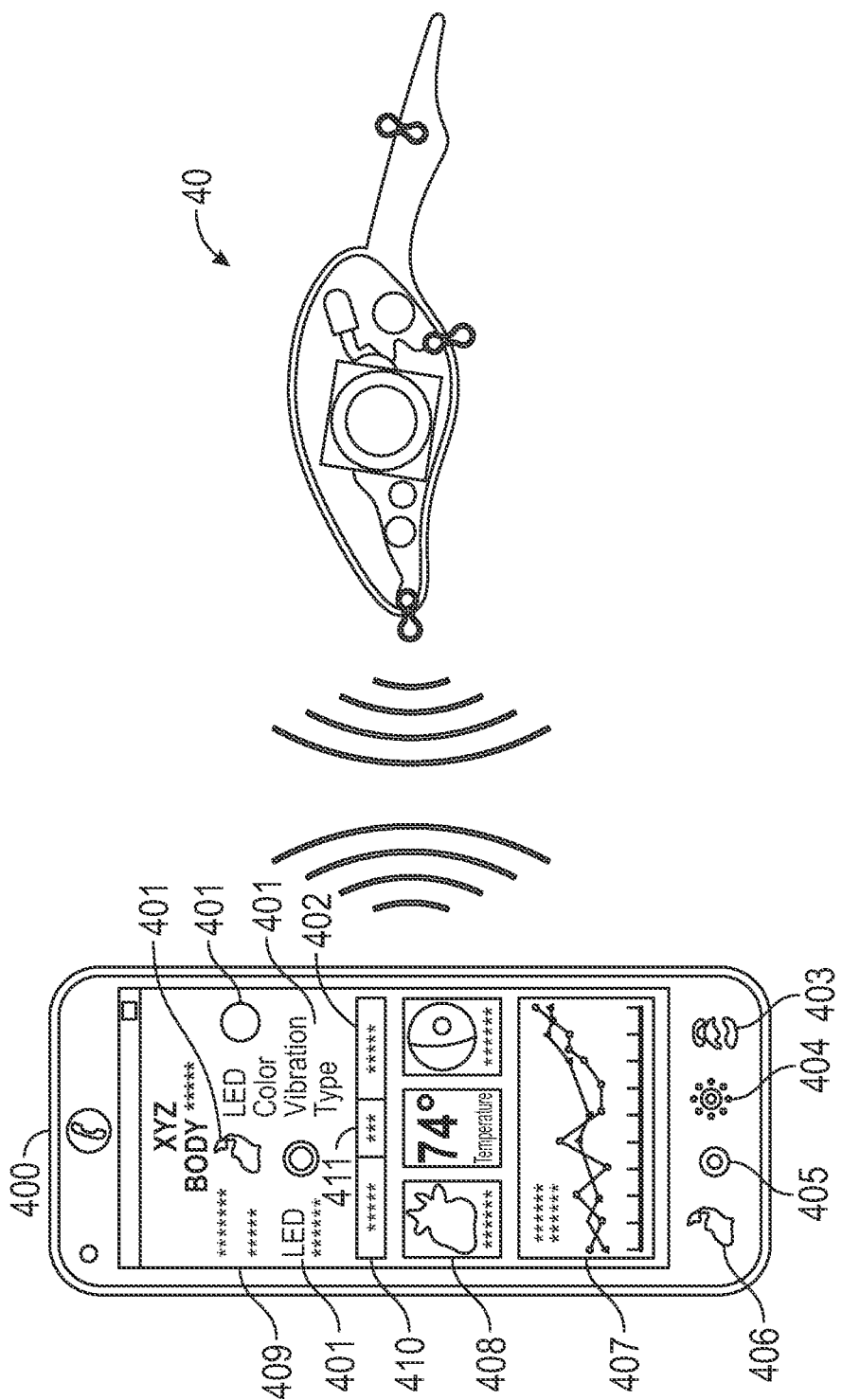
FIG. 4 displays the functions of the custom application device used in one embodiment of the present invention.

In further embodiments, the same or another antenna 7 may be a radio-frequency identification (RFID) tag which is programmed to include fishing lure information which may be read by an external device (e.g., device 400 of FIG. 4). In other embodiments, the controller 10 may include the fishing lure information and the antenna 7 may be a Bluetooth transceiver capable of transferring such fishing lure information to the external device. Such information may be, for example, and without limitation, the lure type and/or lure color. Such is advantageous as the Angler may then take any device capable of reading the antenna 7 (e.g., RFID tag and/or Bluetooth transceiver) and obtain the information, thereby enabling understanding of which lures work best in certain situations and are attracting the most fish.

In further embodiments, the controller 10 can be triggered or controlled via the electrodes 22. The electrodes 22 may be actuated via an actuation means, wherein actuation of at least one of the electrodes 22 gives an operational result to the apparatus 40. Exemplary actuation means may include, for example and without limitation, pressure on the electrode, human contact (physical touch) with the electrode 22, or aqueous solution (e.g., water) between two or more (possibly all) of the electrodes 22, thereby enabling electricity to flow therebetween.

Actuation of the electrodes 22 may result in operational results such as, for example and without limitation, changing a power state of the apparatus 40 (e.g., off to on, or on to off)

or changing the aquatic sound output by the speaker 4 (e.g., which bait fish sound is output). In some embodiments, the operational result may be performed via actuation of less than all (a subset) of the electrodes 22. In other embodiments, actuation of all electrodes 22 may be required for the operational result to occur. In some embodiments, the hooks 32 (FIG. 1) and/or hook connection 34, and/or hook hangers (where the hook couples to the apparatus 40, not shown) may double to also operate as the electrodes 22.

The controller 10 can be triggered to perform in several ways. In various embodiments, controller 10 can be triggered to perform as programmed when motion sensor 16 signals controller 10 that a sufficient change in velocity has occurred. Controller 10 adjusts the sound emitted from speaker 4 which, in turn, adjusts the vibration frequency 20 emitted from the speaker 4. Water detection sensor 8 can trigger the controller 10 when the apparatus enters the water. The user can also trigger controller 10 to perform through the antenna 7. It is envisioned that this embodiment will enable the user to control certain aspects of the apparatus through a custom application running on a personal electronic device. Thus, controller 10 can be triggered to perform as programmed by the user running the custom application. Once triggered, controller 10 can perform as programmed or until it receives a signal from antenna 7.

In other embodiments, the controller may be programmed to turn off the apparatus 40 after a predetermined period of time has expired, unless there has been electrical conductivity on at least one of the electrodes 22 before the predetermined period of time occurs or expires.

According to one embodiment of the present disclosure, once controller 10 is triggered, it acquires and transmits certain environmental conditions to the user via the antenna 7. Temperature sensor 15 sends water temperature to controller 10, while water direction system 17 acquires the velocity of the water. Based on these readings, controller 10 can perform automatically based on pre-programmed algorithms changing the characteristics of the apparatus. The readings will also be transmitted to the personal electronic device via antenna 7. In other embodiments, controller 10 acquires and logs other environmental conditions of the water, including turbidity, pH levels, plankton content, oxygen saturation, thermo dine readings and toxic levels within the habitat and surrounding areas.

Figure 3A:
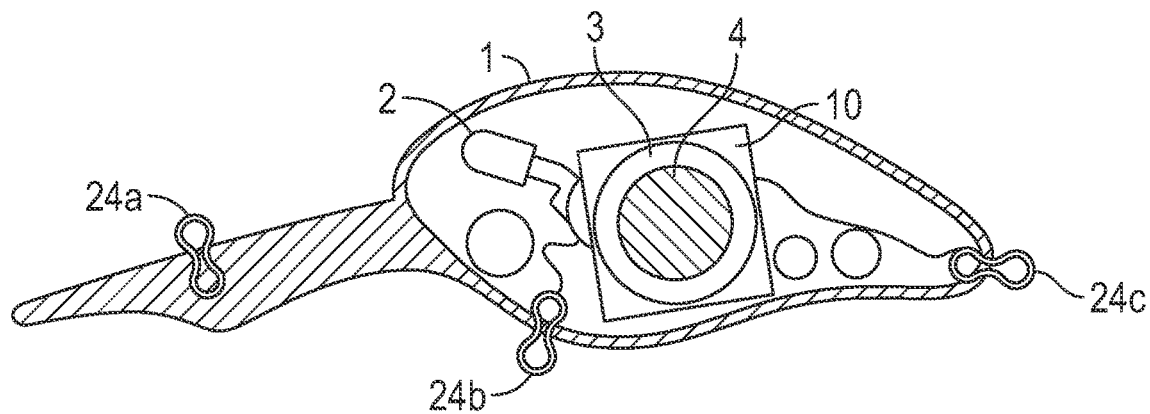
FIG. 3A is a cross-sectional view of electronics arranged within the inner capsule, according to one or more embodiments.
Figure 3B:
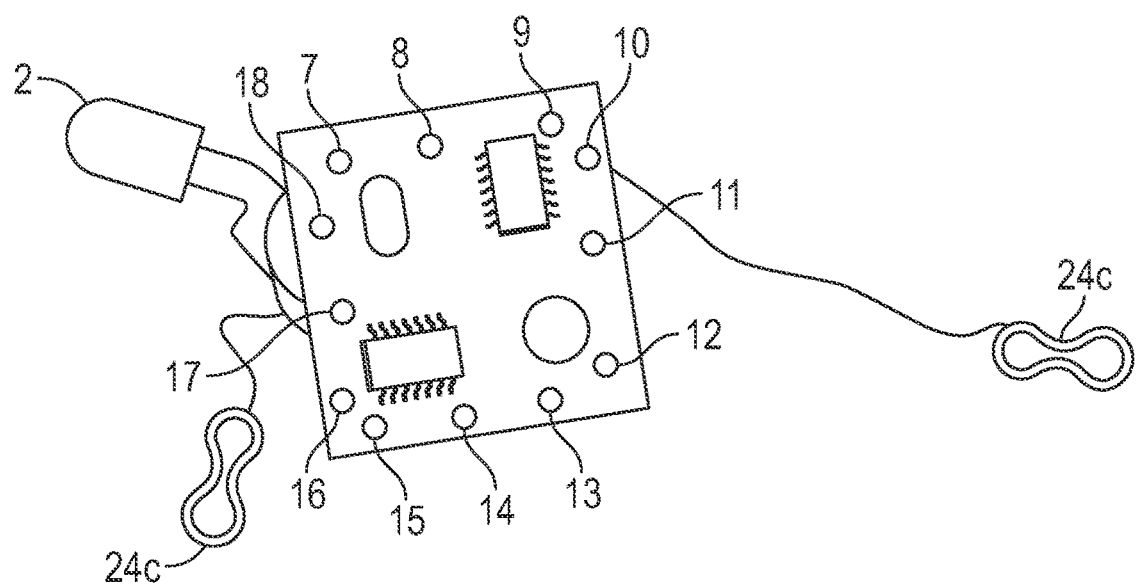
FIG. 3B displays the internal components, sensors, and processors of the aquatic life simulation apparatus, according to one or more embodiments.

FIG. 3A illustrates a cross-sectional view of electronics arranged within the inner capsule 1. According to one embodiment, the inner capsule includes the battery 3, speaker 4, and controller 10. The inner capsule may also include an LED 2 coupled to the controller 10. FIG. 3B displays a layout of the electronic circuit in inner capsule 1 of an embodiment with wireless capability. In this embodiment, wireless controller 10 communicates with the custom application through multiple wireless systems. First, controller 10 can send and receive data through standard WiFi 2.4 GHz antenna 7. According to one embodiment of the present disclosure, the controller 10 is also capable of communicating on lower frequency channels via 315 MHz antenna 13 and 900 MHz antenna 18. Near field communication (NFC) and Bluetooth low energy (BLE) technologies are also wireless communications methods used by controller 10 via NFC antenna 11 and BLE antenna 14, respectively. The plurality of wireless systems used by controller 10 allow the custom application to be loaded and used on many different wireless platforms.

The user can modify the performance of the apparatus using a custom application loaded on an electronic device. It is envisioned that the electronic device will send signals generated according to the user's input that can be received by any of the wireless platforms included in capsule 1. The wireless platform relays these signals to controller 10. Controller 10 adjusts the sound emitted from speaker 4 which, in turn, adjusts the vibration frequency emitted from the speaker 14, or the light emitted from LED 2, or any combination thereof, based on the signals received from the user.

In some embodiments, the electrodes 22 and associated embodiments previously discussed in FIG. 2, may be in the form of hook hangers 24. As depicted, the lure includes a front hook hanger 24a, a belly hook hanger 24b, and a tail hook hanger 24c. As the hook hangers 24 may be metal in some embodiments, they are ideal for having duplicate functionality of both acting as an electrode (e.g., electrode 22), but also functioning as a place to couple hooks for catching fish. Turning to FIG. 4, the onboard equipment computers, tablets, handheld PDA's and smart phones, depicted as external device 400, can send commands to apparatus 40 via a custom application to change wave sound pitch, change frequency of VSED fading in and out and change color of VSED among others. The apparatus has the ability to be turned off or on via the application on devices smart phones, PDA's, PC, notebooks, tablets or on board computer. According to one embodiment of the present disclosure, the sound can be changed to a different sound or pitch and/or shut off completely, the LED can be changed to different colors or patterns and/or shut off completely. Different sounds, pitches, patterns in the emitted sound and LED lights patterns can be wirelessly uploaded to apparatus through application. This can also be done through micro, mini and full size USB jacks. In further embodiments, the controller 10 (FIG. 2) may be programmed to turn off the apparatus 40 after a predetermined period of time has expired, unless there is communication with the external device 400 before the predetermined period of time occurs or expires.

Custom application 409 features many functions. There are capacitive controls 401 that can be sent to the capsule. In the embodiment displayed in FIG. 4, custom application 409 controls the sound, LED color, LED effect, and vibration type of inner capsule 1. When the user desires to change the sound emitted from inner capsule 1, he can do so using sound emission control 403. LED control 404 allows the user to activate the LED and control the amount of light emitted. Type of illumination control 405 and type of fish sound control 406 are used to alter the type of illumination and the type of fish sound is emitted from inner capsule 1, respectively.

Controller 10 also, in some embodiments, has data acquisition capability. Custom application 409 displays the data stored by controller 10 in a user-friendly interface. The interface helps the user determine control settings. Water property readings 407 are displayed in graph form so the user can see changes in certain water properties over time. Environmental data readings 408 tell the user the conditions outside the water. Fish catching log 410 and time of catch 402 are also displayed.

Figure 5:
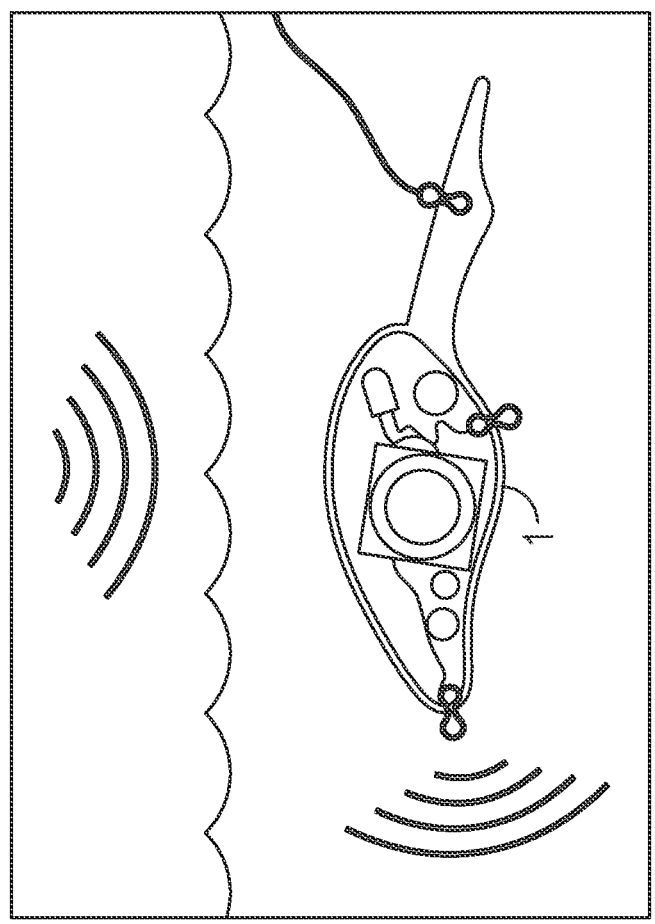
FIG. 5 displays the communication between the custom application, device, and the lure, according to one or more embodiments.
Figure 5:
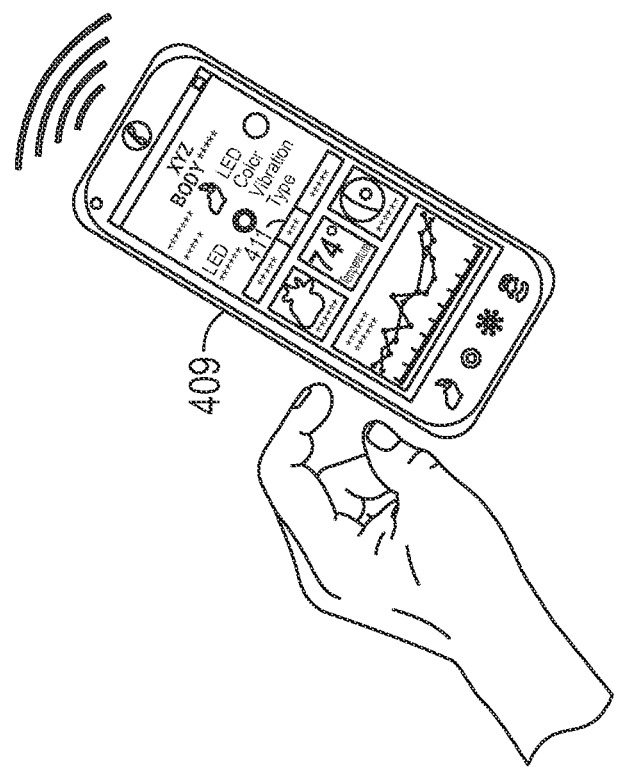
Figure 6:
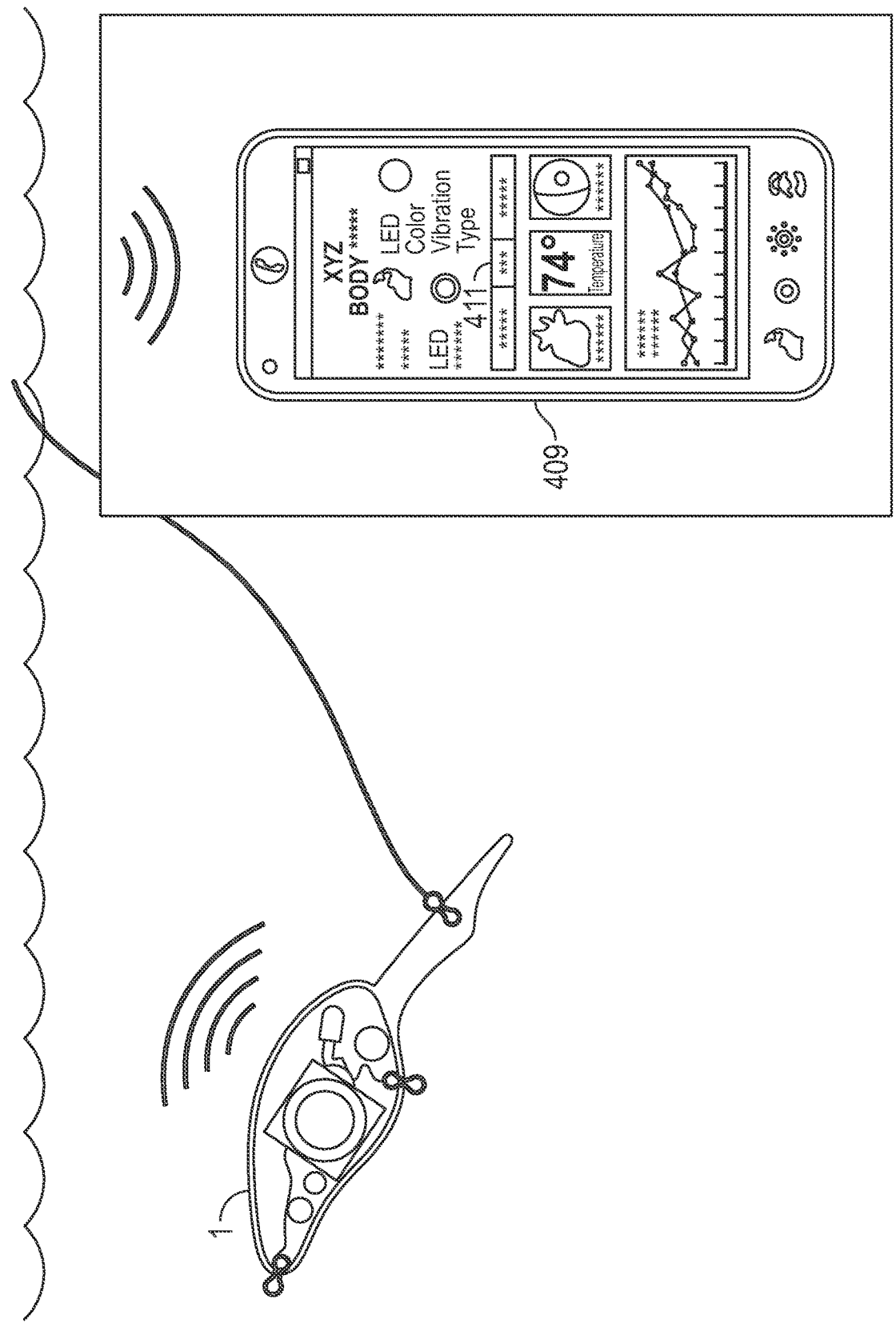
FIG. 6 displays the data interaction between the custom application and the lure, according to one or more embodiments.
Figure 7:
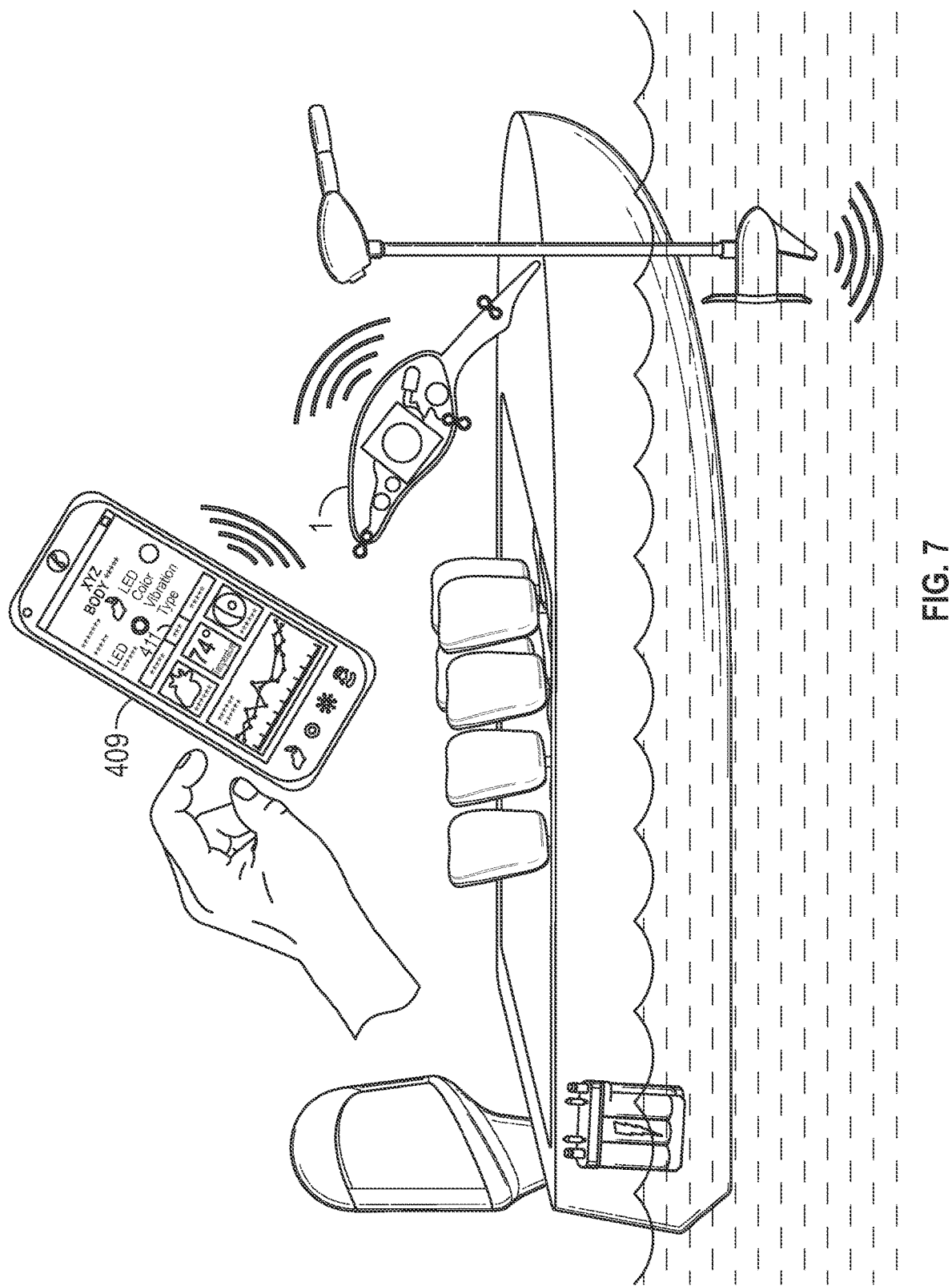
FIG. 7 displays the communication between the custom application and the lure, according to one or more embodiments.

On a typical day out on the lake, the user begins by programming controller 10 via custom application 409 before inner capsule 1 is cast as shown in FIG. 5. Inner capsule 1 collects data while it is submerged. Once inner capsule 1 is pulled from the water, the data collected is transferred to custom application 409. Based on the data collected during the cast, the user can make changes to the settings before the next cast through custom application 409. Custom application 409 logs the data from inner capsule 1 in real time once inner capsule 1 is out of the water as shown in FIG. 7. Data is exchanged between inner capsule 1 and custom application 409 each time inner capsule 1 exits the water.

Figure 9:
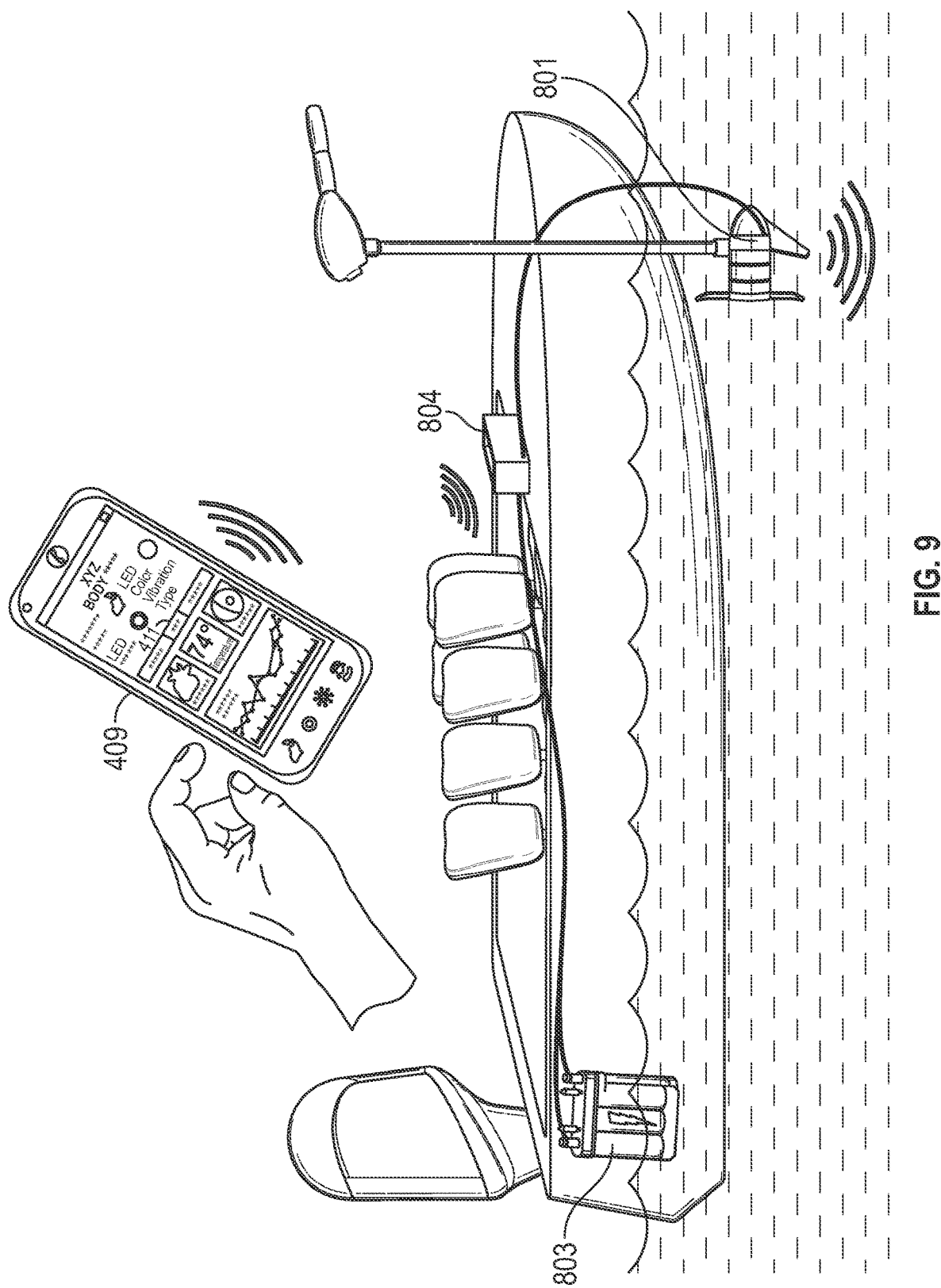
FIG. 9 displays the data exchange between the custom application and an alternative Sports Aquatic Marine Instruments (SAMI) units, according to one or more embodiments.

The current disclosure can be used alongside other Sports Aquatic Marine Instruments (S.A.M.I.) as shown in FIG. 8. Underwater unit 801 is attached to the boat such that it is submerged the entire time the boat is in the water. Underwater unit 801 takes water property readings continuously including turbidity, pH level, and water clarity. Underwater unit 801 is connected via cable to on board control unit 804 which enables constant relay of the data from underwater unit 801 to on board control unit 804. On board control unit 804 is also in constant communication with custom application 409 as shown in FIG. 9. The readings taken by underwater unit 801 are combined with environmental data readings 408 (FIG. 4) to determine if the fishing conditions are good in that location. Both on board control unit 804 and underwater unit 801 are powered by on board power source 803, typically the battery.

Figure 10:
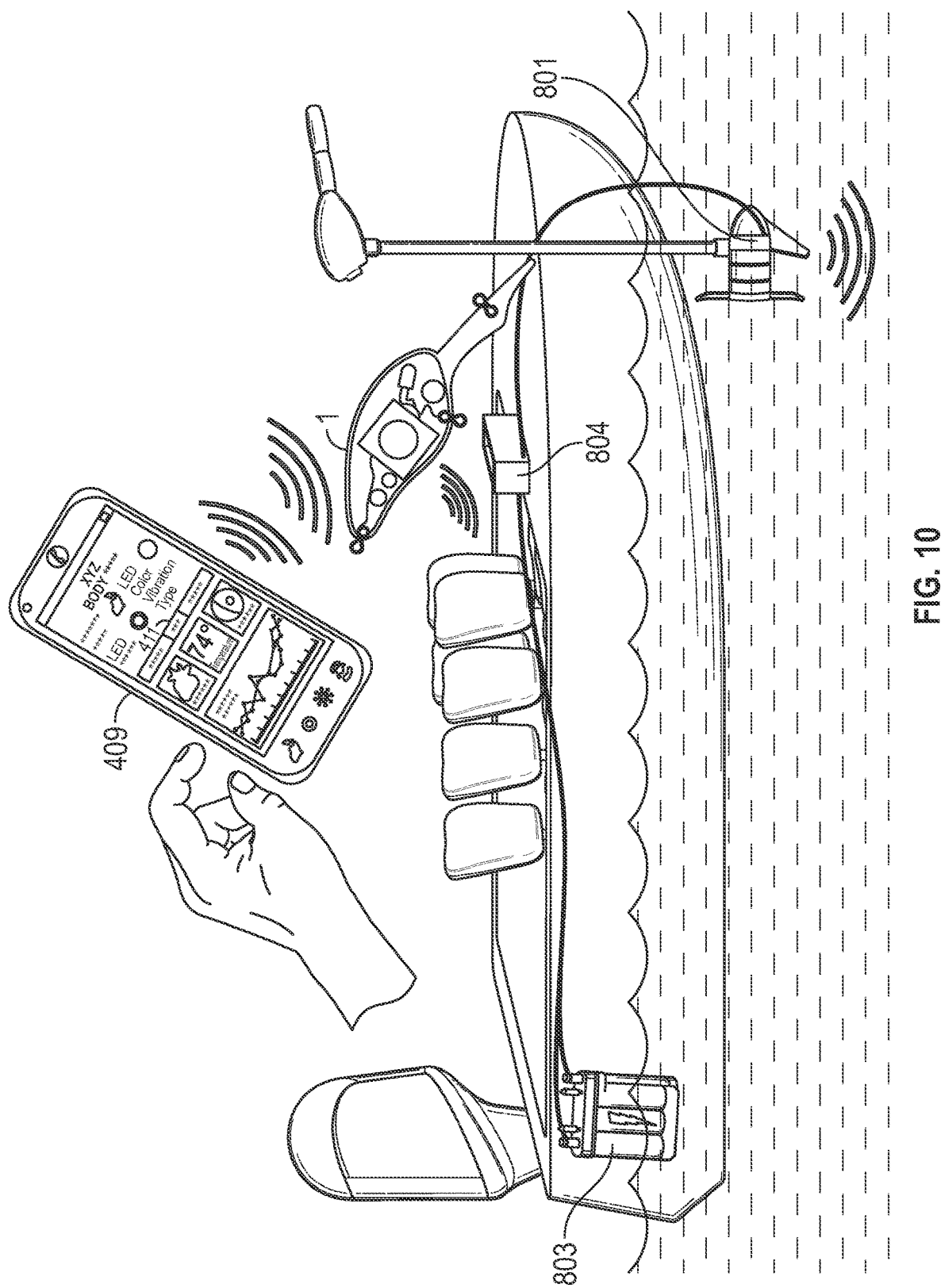
FIG. 10 displays communications between the custom application and multiple SAMI devices, including the lure, according to one or more embodiments.

Once inner capsule 1 is brought on board, custom application 409 will then send to and receive data from inner capsule 1, while still being in communication with on board control unit 804, as shown in FIG. 10.

Figure 11:
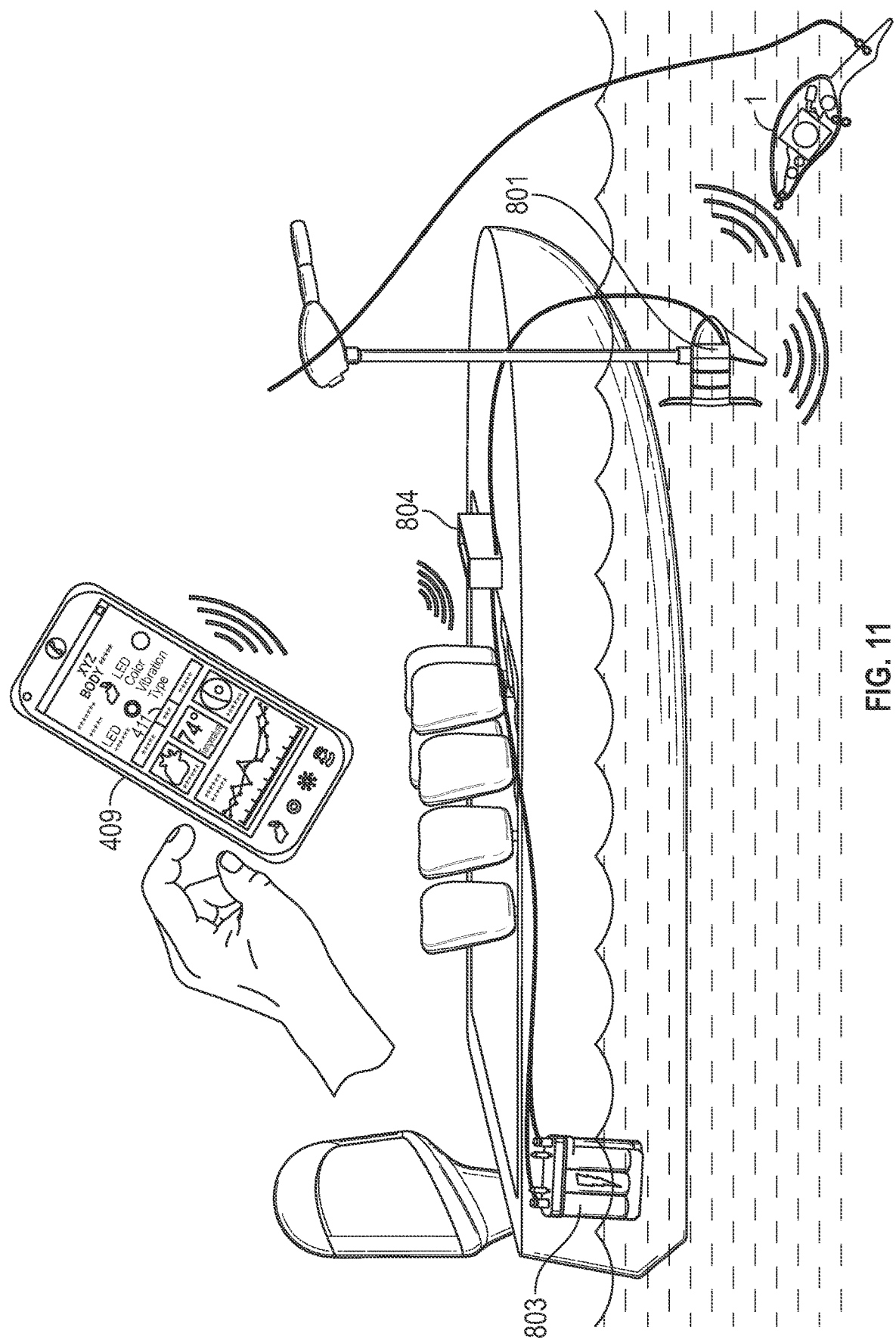
FIG. 11 displays the interaction between multiple SAMI devices while the lure is in the water, according to one or more embodiments.

In certain applications, inner capsule 1 communicates with underwater unit 801 while submerged, as shown in FIG. 11. Underwater unit 801 relays the data collected from inner capsule 1, along with the data collected by underwater unit 801, to on board control unit 804. The user can then receive real time data from, and send real time commands to, inner capsule 1 as well as the board control unit 804.

In some of these embodiments, similar to discussed above, a tail chamber of apparatus 40 holds an RF "radio frequency" tag, WiFi component and/or blue tooth transmitter to communicate with top side on board computer, tablets, PDA and smart phones through custom application 409 suited for this particular function of programming, executing and reading certain environmental conditions of habitats of aquatic life and the reaction of species in salt and freshwater conditions.

In such configurations, iOS, PC, Tablet, Notebook, Smartphone, PDA with RF tag or WiFi components, or blue tooth transmitter in NFC system integration (Near Field Communication) permit communications with the underwater device and on board controls.

In other embodiments, a headphone jack adapter is the functioning device that affects the control of the underwater observation device and give commands that executes color changing in the exterior capsule 50 and VSED's. Pitch control and variance also comes from commands from the adapter. An adapter is used in conjunction with iOS, tablet, notebook, PC, smart phone, PDA application and include different modes to control underwater device for specific tasks while underwater. Finger control on custom application 409 and push button tabs are the complete route of the way commands are executed. Different sounds, pitches, patterns and LED lights, patterns can be wirelessly uploaded to apparatus through application. This can also be done through micro, mini and full size USB jacks.

In still other embodiments, controller 10 in inner capsule 1 houses a proximity sensor embedded within controller 10 that senses when to add decibels to the pitch and when to lower the decibel. The proximity chip also controls the VSED feature of controlling color and intensity of VSED color choice at the time of observation. Detection of proximity of species in habitat environment determines the amount of electrical current powering controller 10, WiFi, NFC, and blue tooth chips through the automatic proximity sensor embedded within inner capsule 1.

In still other embodiments, a micro video chip sensitive transmitter is embedded inside inner capsule 1 or the on board controller 804, and is capable of sending images to on-board equipment tablets, PC's, notebooks, iOS devices, PDA, smart phones, or navionic equipment that are running custom application 409.

Although the disclosure has been described with reference to specific embodiments, this description is not meant to be construed in a limited sense. Various modifications of the disclosed embodiments, as well as alternative embodiments will become apparent to persons skilled in the art upon the reference to the description of the disclosure. It is, therefore, contemplated that the appended claims will cover such modifications that fall within the scope of the disclosure.

The invention claimed is:

1. A multiple mode fishing lure, comprising:
    a main body portion having a waterproof inner capsule;
    said waterproof inner capsule containing an electronic circuit comprising:
        a controller having a memory configured to replaceably store a plurality of groups of digital sound file data each for generating a different live bait fish sound and a plurality of groups of LED control file data, wherein said plurality of groups of digital sound file data for generating the different live bait fish sounds and said plurality of groups of LED control file data are wirelessly transmitted from an application on a user controlled external processing device to the memory of the multiple mode fishing lure, said controller being operationally coupled to:
        a speaker to broadcast a live bait fish sound associated with a selected digital sound file data selected via the application from the plurality of groups of digital sound file data and generated from the selected digital sound file data;
        at least one visual stimulation emitting diodes (VSED) located in a position of eyes of the multiple mode fishing lure, wherein the at least one VSED is configured to generate a recurring light pattern of fading-in fading-out between at least two colors in a predetermined time pattern that simulates a natural occurrence of light reflecting from a fish's eyes known as "flashing";
        a wireless transceiver configured to receive said plurality of groups of digital sound file data for generating the different live bait fish sounds and said plurality of groups of LED control file data from the application on the user controlled external processing device;
        a plurality of electrodes, wherein each electrode of said plurality of electrodes is actuated via an actuation means, and wherein actuation of at least one electrode of said plurality of electrodes gives an operational result;
    wherein broadcasting of the live bait fish sound and generating of the light pattern are controlled by the controller responsive to user inputs received through the application on the user controlled external processing device;
    wherein a selected LED control file data selected via the application from the plurality of groups of LED control file data causes the at least one VSED located in the position of eyes of the multiple mode fishing lure to control the at least two colors and intensity of the at least one VSED; and at least one hook coupled to said main body portion.

2. The multiple mode fishing lure of claim 1, wherein said operational result is changing a power state of said multiple mode fishing lure.

3. The multiple mode fishing lure of claim 1, wherein said actuation means comprises a physical touch of said at least one electrode.

4. The multiple mode fishing lure of claim 1, wherein said actuation means comprises an aqueous solution between said at least one electrode, thereby enabling electricity to flow therebetween.

5. The multiple mode fishing lure of claim 1, wherein at least one of volume, vibration frequency, pattern and pitch of said live bait fish sound broadcast by said speaker are changed responsive to the user inputs wirelessly received at the controller from the application on the user controlled external processing device.

6. The multiple mode fishing lure of claim 5, wherein said operational result is obtained by actuation of a subset of said plurality of electrodes.

7. The multiple mode fishing lure of claim 1, wherein at least one of said plurality of electrodes is a hook hanger.

8. The multiple mode fishing lure of claim 1, wherein each of said plurality of electrodes is a hook hanger.

9. The multiple mode fishing lure of claim 1, wherein said controller turns off said multiple mode fishing lure after a predetermined period of time has expired, unless there is electrical conductivity on the at least one electrode of said plurality of electrodes before said predetermined period of time occurs.

10. The multiple mode fishing lure of claim 1, wherein said controller turns off said multiple mode fishing lure after a predetermined period of time has expired, unless there is communication with the application on said user controlled external processing device before said predetermined period of time occurs.

11. The multiple mode fishing lure of claim 1, further comprising an aqueous ambient condition monitoring means for acquiring aqueous ambient condition data and communicably coupled to said controller, wherein said user controlled external processing device is configured to read said acquired aqueous ambient condition data from said multiple mode fishing lure.

12. The multiple mode fishing lure of claim 1, further comprising a radio-frequency identification (RFID) tag programmed with fishing lure information that is represented by the multiple mode fishing lure, and wherein said user controlled external processing device is configured to read said RFID tag to obtain said fishing lure information.

13. The multiple mode fishing lure of claim 1, wherein said controller further includes fishing lure information that is represented by the multiple mode fishing lure, said multiple mode fishing lure further comprising a Bluetooth transceiver capable of communicating said fishing lure information with the application on said user controlled external processing device.

14. The multiple mode fishing lure of claim 13, further comprising an aqueous ambient condition monitoring means for acquiring aqueous ambient condition data and communicably coupled to said controller, wherein said user controlled external processing device is further configured to read said acquired aqueous ambient condition data.

15. The multiple mode fishing lure of claim 1, wherein said speaker is a piezoelectric brass speaker.

16. The multiple mode fishing lure of claim 1 further comprising a motion sensor for detecting impact with water and initiating broadcast of the live bait fish sound and generation the light pattern.

17. A multiple mode fishing lure, comprising:
a main body portion having a waterproof inner capsule;
a controller within said waterproof inner capsule having a memory configured to selectively store digital sound file data and LED control file data, wherein said digital sound file data and said LED control file data are wirelessly transmitted from an application on a user controlled external processing device to the memory of the multiple mode fishing lure;
a speaker to broadcast live bait fish sound associated with a selected digital sound file data of the stored digital sound file data selected via the application and generated from the selected digital sound file data of the stored digital sound file data;
at least one visual stimulation emitting diodes (VSED) located in a position of eyes of the multiple mode fishing lure, wherein the at least one VSED is configured to generate a recurring light pattern of fading-in fading-out between at least two colors in a predetermined time pattern that simulates a natural occurrence of light reflecting from a fish's eyes known as "flashing";
a wireless transceiver configured to receive said digital sound file data and said LED control file data from the application on said user controlled external processing device;
the digital sound file data comprising a plurality of digital sound files each for generating a different live bait fish sound stored in the memory, the plurality of digital sound files for generating the different live bait fish sounds uploaded wirelessly from the user controlled external processing device via the wireless transceiver;
the LED control file data comprising a plurality of LED control files stored in memory, the plurality of LED control files uploaded wirelessly from the user controlled external processing device via the wireless transceiver:
wherein broadcasting of the live bait fish sound and generating of the light pattern are controlled by the controller responsive to user inputs received through the application on the user controlled external processing device to select the selected digital sound file data from the plurality of digital sound files and a selected LED control file data from the plurality of LED control files;
wherein the selected LED control file data selected via the application from the plurality of LED control files causes the at least one VSED located in the position of eyes of the multiple mode fishing lure to control the at least two colors and intensity of the at least one VSED;
a motion sensor for detecting impact of the multiple mode fishing lure with water and initiating broadcast of the live bait fish sound and generation the light pattern by the controller responsive to the impact detection; and
at least one hook coupled to said main body portion.

18. The multiple mode fishing lure of claim 17, wherein the controller alters a volume of the live bait fish sound and a vibration frequency of the live bait fish sound responsive to the user inputs to the controller.

19. A multiple mode fishing lure, comprising:
a main body portion having a waterproof inner capsule;
a controller within said waterproof inner capsule having a memory configured to selectively store a plurality of groups of digital sound file data each for generating a different live bait fish sound, wherein said plurality of groups of digital sound file data for generating the different live bait fish sounds are wirelessly transmitted from a user controlled external device to the multiple mode fishing lure;

a speaker to broadcast a live bait fish sound associated with a selected digital sound file data selected via an application from the plurality of groups of digital sound file data and generated from the selected digital sound file data;

wherein the controller alters a volume of the live bait fish sound and a vibration frequency of the live bait fish sound responsive to user input to the controller;

at least one visual stimulation emitting diodes (VSED) located in a position of eyes of the multiple mode fishing lure, wherein the at least one VSED is configured to generate a recurring light pattern of fading-in fading-out between at least two colors in a predetermined time pattern that simulates a natural occurrence of light reflecting from a fish's eyes known as "flashing";

wherein the controller causes the at least one VSED located in the position of eyes of the multiple mode fishing lure to control the at least two colors and intensity of the at least one VSED;

a wireless transceiver configured to receive said plurality of groups of digital sound file data for generating the different live bait fish sounds from said user controlled external device; and at least one hook coupled to said main body portion.

* * * * *